(12) United States Patent
Harris et al.

(10) Patent No.: US 10,798,604 B2
(45) Date of Patent: Oct. 6, 2020

(54) ENHANCED UNATTENDED DATA IN APPLICATION LAYER TRAFFIC OPTIMIZATION

(71) Applicant: NOKIA SOLUTIONS AND NETWORKS OY, Espoo (FI)

(72) Inventors: John Harris, Whitefish Bay, WI (US); Claire Sabine Randriamasy, Meudon (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/341,971

(22) PCT Filed: Oct. 14, 2016

(86) PCT No.: PCT/US2016/056983
§ 371 (c)(1),
(2) Date: Apr. 15, 2019

(87) PCT Pub. No.: WO2018/071037
PCT Pub. Date: Apr. 19, 2018

(65) Prior Publication Data
US 2019/0246313 A1 Aug. 8, 2019

(51) Int. Cl.
*H04W 28/02* (2009.01)
*H04W 28/06* (2009.01)

(52) U.S. Cl.
CPC ... *H04W 28/0284* (2013.01); *H04W 28/0247* (2013.01); *H04W 28/0289* (2013.01); *H04W 28/06* (2013.01)

(58) Field of Classification Search
CPC ............ H04W 28/0284; H04L 47/2475
See application file for complete search history.

(56) References Cited

U.S. PATENT DOCUMENTS

2013/0003591 A1* 1/2013 Novak ............... H04W 72/085
370/252
2014/0334318 A1 11/2014 Pica et al.
(Continued)

FOREIGN PATENT DOCUMENTS

GB 2550214 * 5/2013 ............ H04W 48/02

OTHER PUBLICATIONS

International Search Report and Written Opinion dated Jan. 24, 2017 corresponding to International Patent Application No. PCT/US2016/056983.
(Continued)

*Primary Examiner* — Myron Wyche
(74) *Attorney, Agent, or Firm* — Squire Patton Boggs (US) LLP

(57) ABSTRACT

Various communication systems may benefit from an improved signaling protocol. For example, an application layer traffic optimization protocol or an over-the-top protocol may benefit from improved signaling in dealing with unattended data. A method, in certain embodiments, may include sending congestion information of a first access point as part of the application layer traffic optimization from a network entity to a user equipment. The congestion information can comprise a first congestion level relating to a first radio interface message value at the first access point and a second congestion level relating to a second radio interface message value at the first access point. In addition, the user equipment may be configured to determine a current level of congestion at the first value, the second congestion level, and the second radio interface messaging value.

20 Claims, 3 Drawing Sheets

(56) References Cited

U.S. PATENT DOCUMENTS

| | | |
|---|---|---|
| 2015/0172955 A1 | 6/2015 | Meekel et al. |
| 2015/0215220 A1* | 7/2015 | Yiu .................... H04L 47/2475 |
| | | 370/230 |
| 2016/0073282 A1* | 3/2016 | Speicher ........... H04W 28/0284 |
| | | 370/230 |
| 2016/0080962 A1 | 3/2016 | Harris et al. |
| 2016/0080970 A1 | 3/2016 | Harris et al. |
| 2017/0164238 A1* | 6/2017 | Paredes Cabrera ... H04W 28/22 |

OTHER PUBLICATIONS

Extended European Search Report issued in corresponding European Patent Application No. 16918918.0-1215 dated Mar. 30, 2020.
R. Alimi et al., "Application-Layer Traffic Optimization (ALTO) Protocol", Internet Engineering Task Force (IETF) Request for Comments: 7285, Category: Standards Track, ISSN: 2070-1721, Sep. 2014, 91 pages.

* cited by examiner

ENHANCED UNATTENDED DATA IN APPLICATION LAYER TRAFFIC OPTIMIZATION

BACKGROUND

Field

Various communication systems may benefit from an improved signaling protocol. For example, an application layer traffic optimization protocol or an over-the-top protocol may benefit from improved signaling in dealing with unattended data.

Description of the Related Art

3rd Generation Partnership Project (3GPP) technology, such as Long Term Evolution (LTE), may provide for unattended data. Unattended data is data traffic of which the user is unaware, but is nevertheless transmitted to or from a user equipment. An indication of the unattended data may be provided to an idle or connected user equipment as part of low latency or fresh congestion information. Unattended data may account for a significant amount of traffic in a network, and an indication of the unattended data can inform a user equipment (UE) or a network entity of whether unattended data is allowed, or whether the unattended data is selectively blocked.

Although an indication that unattended data is allowed may be based on very low latency congestion information, the observed congestion data lacks congestion detail as it only indicates if unattended data is allowed or not allowed. This limited detail is capable of providing limited congestion information detail to the UE, such as a limited of single or a relatively 'opaque' bit congestion information.

Internet Engineering Task Force (IETF) Application Layer Traffic Optimization (ALTO) protocol is an over-the-top (OTT) content mechanism that provides guidance to content delivery applications, such as peer-to-peer (P2P) or content delivery networks (CDN), which may select one or several hosts to endpoints from a set of candidates that are able to provide a desired data resource. ALTO may be executed by at least one server deployed by a Network Operator (NO). ALTO may be used to convey slow changing, longer-term end to end path information to UEs or user devices. The path information may reflect the cost and properties between endpoints, where endpoints can be application resources locations in the network as well as in the UEs. Path information may be conveyed to UEs on a per UE-to-eNB link basis that can reflect various network costs with regards to administrative policy or traffic engineering considerations, such as network congestion.

SUMMARY

A method, in certain embodiments, may include sending congestion information of a first access point as part of the application layer traffic optimization from a network entity to a user equipment. The congestion information can comprise a first congestion level relating to a first radio interface message value at the first access point and a second congestion level relating to a second radio interface message value at the first access point. In addition, the user equipment may be configured to determine a current level of congestion at the first access point based on the first congestion level, the first radio interface messaging value, the second congestion level, and the second radio interface messaging value.

According to certain embodiments, an apparatus may include at least one memory including computer program code, and at least one processor. The at least one memory and the computer program code may be configured, with the at least one processor, to cause the apparatus at least to send congestion information of a first access point as part of the application layer traffic optimization from a network entity to a user equipment. The congestion information can comprise a first congestion level relating to a first radio interface message value at the first access point and a second congestion level relating to a second radio interface message value at the first access point. In addition, the user equipment may be configured to determine a current level of congestion at the first access point based on the first congestion level, the first radio interface messaging value, the second congestion level, and the second radio interface messaging value.

An apparatus, in certain embodiments, may include means for sending congestion information of a first access point as part of the application layer traffic optimization from a network entity to a user equipment. The congestion information can comprise a first congestion level relating to a first radio interface message value at a first access point and a second congestion level relating to a second radio interface message value at the first access point. In addition, user equipment may be configured to determine a current level of congestion at the first access point based on the first congestion level, the first radio interface messaging value, the second congestion level, and the second radio interface messaging value.

According to certain embodiments, a non-transitory computer-readable medium encoding instructions that, when executed in hardware, perform a process. The process may include sending congestion information of a first access point as part of the application layer traffic optimization from a network entity to a user equipment. The congestion information can comprise a first congestion level relating to a first radio interface message value at the first access point and a second congestion level relating to a second radio interface message value at the first access point. In addition, the user equipment may be configured to determine a current level of congestion at the first access point based on the first congestion level, the first radio interface messaging value, the second congestion level, and the second radio interface messaging value.

According to certain embodiments, a computer program product encoding instructions for performing a process according to a method. The method includes sending congestion information of a first access point as part of the application layer traffic optimization from a network entity to a user equipment. The congestion information can comprise a first congestion level relating to a first radio interface message value at the first access point and a second congestion level relating to a second radio interface message value at the first access point. In addition, the user equipment may be configured to determine a current level of congestion at the first access point based on the first congestion level, the first radio interface messaging value, the second congestion level, and the second radio interface messaging value.

A method, in certain embodiments, may include receiving at a user equipment from a network entity congestion information of a first access point as part of an application layer traffic optimization. The congestion information can comprise a first congestion level relating to a first radio interface message value at the first access point and a second congestion level relating to a second radio interface message value at the first access point. The method can also include determining as part of the application layer traffic optimization a level of congestion at the first access point based on the first congestion level, the first radio interface value, the second congestion level, and the second radio interface value.

According to certain embodiments, an apparatus may include at least one memory including computer program code, and at least one processor. The at least one memory and the computer program code may be configured, with the at least one processor, to cause the apparatus at least to receive at a user equipment from a network entity congestion information of a first access point as part of an application layer traffic optimization. The congestion information can comprise a first congestion level relating to a first radio interface message value at the first access point and a second congestion level relating to a second radio interface message value at the first access point. The at least one memory and the computer program code may also be configured, with the at least one processor, to cause the apparatus at least to determine as part of the application layer traffic optimization a current level of congestion at the first access point based on the first congestion level, the first radio interface value, the second congestion level, and the second radio interface value.

An apparatus, in certain embodiments, may include means for receiving at a user equipment from a network entity congestion information of a first access point as part of an application layer traffic optimization. The congestion information can comprise a first congestion level relating to a first radio interface message value at the first access point and a second congestion level relating to a second radio interface message value at the first access point. The apparatus may also include means for determining as part of the application layer traffic optimization a current level of congestion at the first access point based on the first congestion level, the first radio interface value, the second congestion level, and the second radio interface value.

According to certain embodiments, a non-transitory computer-readable medium encoding instructions that, when executed in hardware, perform a process. The process may include receiving at a user equipment from a network entity congestion information of a first access point as part of an application layer traffic optimization. The congestion information can comprise a first congestion level relating to a first radio interface message value at the first access point and a second congestion level relating to a second radio interface message value at the first access point. The process may also include determining as part of the application layer traffic optimization a current level of congestion at the first access node based on the first congestion level, the first radio interface value, the second congestion level, and the second radio interface value.

According to certain embodiments, a computer program product encoding instructions for performing a process according to a method including receiving at a user equipment from a network entity congestion information of a first access point as part of an application layer traffic optimization. The congestion information can comprise a first congestion level relating to a first radio interface message value at the first access point and a second congestion level relating to a second radio interface message value at the first access point. The method may also include determining as part of the application layer traffic optimization a current level of congestion at the first access node based on the first congestion level, the first radio interface value, the second congestion level, and the second radio interface value.

BRIEF DESCRIPTION OF THE DRAWINGS

For proper understanding of the invention, reference should be made to the accompanying drawings, wherein.

DETAILED DESCRIPTION

Figure 1:
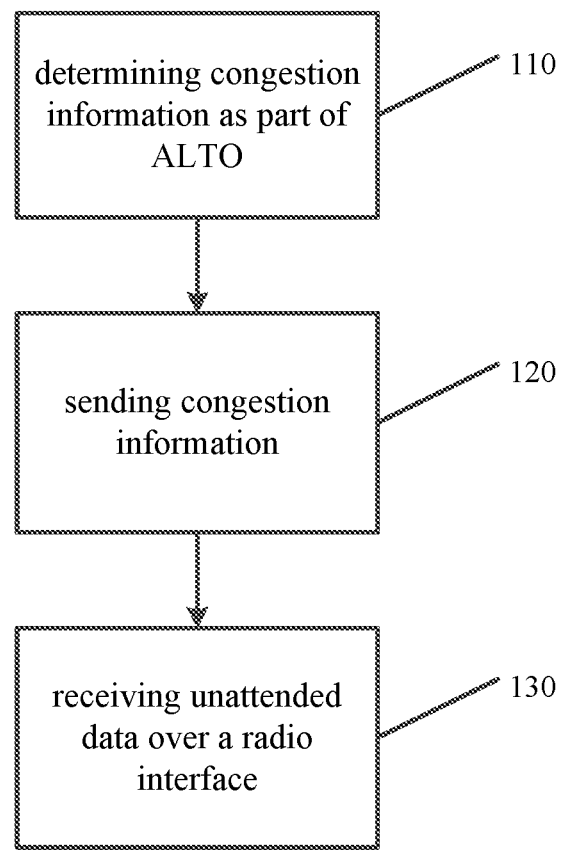
FIG. 1 illustrates a flow diagram according to certain embodiments.

Certain embodiments can help to provide rapidly changing or very fresh congestion information to UEs using a combination of the ALTO protocol messaging and messaging received over a radio interface. By indicating over ALTO the congestion information, which relates to the radio interface messaging, the UE may be able to better estimate the current network congestion level of a cell. For example, the congestion information may be an indication of the unattended data congestion threshold and/or the most likely congestion in the event that the radio interface indicates that unattended data is or is not allowed. When unattended data is not allowed, the transmission of the unattended data from the UE to the network entity may not be allowed. On the other hand, when the unattended data is allowed, the transmission of the unattended data from the UE to the network entity may be allowed.

In certain embodiments, the UE may be provided with further context attributes of a radio frequency link. This may allow the UE to create a more accurate estimate of the network congestion level associated with a particular link having specific context values. In certain embodiments, the context may be attributes of radio interface messaging being broadcast by the cell or by an access point. For example, the radio interface messaging context may be a messaging value of whether unattended data is allowed or not allowed, paging identification values, and/or the order in which the paging identifications are listed within a paging message in a cell. The unattended data indication, for example, may be a single bit over a session information block (SIB).

A network entity may, in some embodiments, use a single congestion threshold for determining whether to indicate to a UE that the unattended data is allowed or not allowed. In such an embodiment, the cell threshold may be static, and the indication may only convey a single threshold. For example, using the single threshold the network entity may consistently indicate that the unattended data is not allowed. The UE may receive the indication not to transmit the unattended data, and delay transmission until unattended data is allowed. However, after waiting for some interval, the UE traffic may no longer be "unattended" such that the transfer needs to occur immediately. Occurring immediately may mean that a transfer will not occur opportunistically during an incrementally lower congestion interval.

In yet another example with a static congestion threshold, a group of neighboring or nearby cells may indicate that the unattended data is not allowed. This may result in the UE with some mobility continuously delaying its unattended data traffic. However, after waiting for some interval, the UE traffic may no longer be "unattended" such that the transfer needs to occur immediately, which means that a transfer will not occur opportunistically during an incrementally lower congestion interval.

In some other embodiments, a network entity may dynamically adjust the congestion threshold to match the longer-term, expected congestion for a given cell. The longer-term, expected threshold may be between 30 to 60 minutes. In certain embodiments, the indication that unattended data is or is not allowed may allow the UE to better identify short-term intervals of relatively low congestion, since unattended data will not be nearly always allowed or not allowed as may be the case with a static congestion threshold, for example. The short-term interval may be shorter than the longer-term expected or average time interval for a given cell. In other words, it may be more efficient for the network entity to set the congestion threshold to be near the average or expected congestion for the long-term interval. The unattended data allowed indicator may then indicate the shorter-term changes in congestion, relative to the long-term congestion state. In certain embodiments, the congestion threshold may be automatically adjusted to match the longer-term congestion state.

When the UE has knowledge of the current congestion threshold information, the UE may be able to better manage and/or schedule the transmission of lower priority or background data, for example, unattended data, as well as estimate an instantaneous or short-term congestion. The threshold information may change relatively slowly in some embodiments. By having knowledge of the threshold, the UE may efficiently schedule and/or manage the transmission of unattended data more efficiently. For example, the UE may use this information to decide whether or not the application traffic the UE is considering transmitting is sufficiently urgent such that the UE is to perform the transfer of the application traffic, given the amount of congestion that would result. In other words, the UE may use this more detailed congestion information (resulting from using both the unattended data indicator and the threshold provided by ALTO) to decide whether to classify a particular set of traffic as unattended data or not.

Certain embodiments may allow for coordinating network congestion information delivery in a system that may utilize an air interface congestion indication and/or ALTO or OTT notification mechanisms. Different network link attributes may be defined for each connection in a cellular network using ALTO mechanisms. The different network link attributes may correspond to different network connection configurations of the same cellular network connection. In some embodiments, a single connection may have at least two sets of different configurations that define different settings of a radio layer indication of short-term network congestion.

In some embodiments, ALTO may also indicate to the UE the value of the congestion in that cell, when that cell is indicating that unattended data is either allowed or not allowed. The value of the congestion may indicate the congestion in that cell in accordance with a particular timescale, for example, a shorter term or a longer term timescale.

In certain embodiments, the radio layer indication may include an indication of whether the unattended data is allowed or not allowed. The indication may be included as part of congestion information sent from the network entity to the UE. In other embodiments, in which the indication may be sent to the UE from the network entity via a paging message, the indication may include an order in which paging identifications are listed within a paging message. Alternatively or in addition to, the indication may include a particular reserved paging identification value for the paging channel.

FIG. 1 illustrates a flow diagram according to certain embodiments. In particular, FIG. 1 illustrates an embodiment of a network entity. In step 110, the network entity may determine congestion information as part of ALTO. Congestion information, for example, may include a congestion threshold and/or an indication of whether unattended data may be allowed or not in a given cell. Once the network entity determines the congestion information as being a part of the ALTO mechanism, the network entity may send as part of the ALTO congestion information of a first access point to the user equipment, as shown in step 120.

The congestion information may comprise a first congestion level relating to a first radio interface message value at the first access point, and a second congestion level relating to a second radio interface message value at the first access point. In certain embodiments, the first and/or second radio interface message value may be a Boolean value. The UE may then be configured to determine a current level of congestion at the first access point based on the first congestion level, the first radio interface value, the second congestion level, and the second radio interface value. The current level of congestion of the first access point may then be determined based on the first congestion level, the first radio interface value, the second congestion level, and a second radio interface value. In some other embodiments, the first level of congestion may relate to the first access node and the second level of congestion may relate to the second access node.

The current level of congestion may be any level of congestion during a time period after the first level of congestion and second level of congestion are determined. In some other embodiments, the current level may be determined during the same time as the first level of congestion and/or the second level of congestion are determined. The first radio interface message value, for example, may indicate that unattended data is allowed, and the second radio interface message value, for example, may indicate that the unattended data is not allowed. The first level of congestion of the first access node and the second level of congestion of the first access node may be identical or different.

When the congestion information includes an indication that the unattended data is not allowed, the UE may utilize the indication as an input to determine or estimate the network congestion level in a network, such as a cellular network or a wireless local area network (WLAN). In some embodiments, the UE may use an indication that the unattended data is not allowed in a first network, for example a cellular network, to determine the transmission of unattended data in a second network, for example a wireless local area network, is not allowed. The UE, in certain embodiments, may therefore assume that a correlation exists between the level of congestion of the cellular network and the WLAN.

In other words, in certain embodiments the UE may leverage the congestion information in a first network, which includes an indication of whether the unattended data is allowed or not allowed, in order to determine or generate an estimate of the network congestion on another or a different network. The congestion of the another network may therefore be a function of the unattended data attribute of the first network.

In certain embodiments, the congestion information received at the UE may include a short-term network congestion indication. The indication may be received from at least two cellular networks and/or at least at least two cells. For example, when the UE receives an indication from a first cellular network and a second cellular network indicating that unattended data may not be allowed, the UE may determine or estimate that the current network congestion level is even greater than when it merely receives a similar indication from the first or second cellular network.

In some embodiments, the UE or a network entity may monitor or observe a signal strength of the UE or the network entity from which the congestion information is received. The UE may then use the signal strength to determine the network congestion level of the network entity. For example, the UE may determine the current reference signal received power (RSRP) and/or reference signal received quality (RSRQ) to determine or estimate the network congestion. In certain embodiments, the ALTO may indicate a cell specific parameter to the UE which allows the UE to determine or estimate the network congestion as a function of the signal strength. The UE may, in certain embodiments, locally observe the signal strength.

The network entity may indicate different congestion information and/or congestion levels for different network connections. Certain embodiments, therefore, may improve the functioning of ALTO by allowing more granular indication to the UE. For example, the congestion information sent by the network entity may include the information relating to uplink and/or downlink congestion, as well as whether the unattended data is allowed or not allowed.

In certain embodiments, a system may include two different cells in which the network congestion threshold may be represented by a unit-less metric ranging from 0 to 100. It may be that the congestion threshold will correspond to a higher level of congestion if the longer-term network congestion level is higher. The larger or smaller numbers correspond to higher radio frequency (RF) costs, while the smaller numbers corresponds to lower radio frequency costs. RF cost may indicate the amount of time that may be needed to transmit unattended data in a network to perform a transfer of a given size. The RF cost may therefore indicate the level of congestion relating to a radio interface message value. For example, in a first cell, in which the network entity indicates that unattended data is allowed, the threshold RF cost may be 20. On the other hand, in a first cell in which the network entity indicates that the unattended data is not allowed, the threshold RF cost may be approximately 40.

The second cell may have a higher RF cost. The threshold RF cost of the second cell when the network entity indicates that unattended data is allowed may be 70, while the threshold RF cost when the unattended data is not allowed may be 90. Although this embodiment may only include two different physical connections and/or cells, from an ALTO perspective there may be four different possible network connections. The four possibilities are a first cell in which the unattended data is indicated as being allowed or not allowed, and a second cell in which the unattended data is indicated as being allowed or not allowed. Further, in some embodiments in which the congestion information includes uplink and/or downlink information, there may be eight different possible network connections. The RF cost may be used to indicate the level of congestion relating to a radio interface message value. The message value may indicate whether transmission of unattended data is allowed or not allowed.

When the first cell indicates that the unattended data may be allowed, the downlink RF cost may be 20, while the uplink RF cost may be 70. On the other hand, when the first cell indicates that the unattended data may not be allowed, the downlink RF cost may be 20, while the uplink RF cost may be 90. The downlink RF cost of the second cell in which unattended data may be allowed may be 70, while the uplink RF cost may be 20. When unattended data may not be allowed in the second cell, the downlink RF cost may be 90 while the uplink cost may be 20.

In a further embodiment, the first cell may be limited by an uplink capacity, while the second cell may be limited by its downlink capacity. In such an embodiment, ALTO may be used to convey congestion information from the network entity to the UE which includes RF costs associated with the downlink limit and/or the uplink limit. To indicate that the same network connection may have two different versions, one corresponding to unattended data being allowed and another corresponding to unattended data not being allowed, the network connection name may have an additional text extension of _UDA for the unattended data being allowed or _UDNA for the unattended data not being allowed. The status change of the indication from _UDA to _UDNA may be triggered when the cell load exceeds a given threshold.

The network congestion threshold, represented by the RF costs in the above embodiments, may be used by the UE to determine whether transmission of unattended data may be allowed. The congestion threshold may be changed on a short-term scale or a long-term scale. Once the UE receives the congestion information including the congestion threshold, the network entity may allow the transmission of unattended data on a shorter timescale, as a function of the short-term variations of the network congestion. In other words, sending the UE dynamic threshold information may allow the UE to be aware of more frequency, shorter-term variations in the network congestion information. The UE may use such information to more efficiently and accurately determine the network congestion level, and send the unattended data to a network entity based on the network congestion level, as shown in step 130. The UE may therefore use the network congestion level to schedule unattended data traffic, which may help to improve the load balancing of a given network.

In certain embodiments, ALTO may provide a range of indications of longer-term network congestion. The congestion information may be a longer timescale, more slowly changing. The UE may receive the congestion information from the network entity as part of ALTO, which the UE may associate with a variety of different connections contexts. Contexts, for example, may correspond to different congestion information or network RF cost values. In some embodiments, the context provided to the UE as part of the congestion information may include a time of day. The UE can track the time of day, and determine which of the network RF cost values are currently the most accurate values during any given time of day.

In some embodiments, the UE may monitor or observe the network connection which the UE uses to connect to the network entity. Depending on the network connection the UE detects, the UE may select appropriate congestion and/or network cost values corresponding to the detected type of network.

As shown in step 120, the UE may receive congestion information as part of the ALTO. The congestion information may include a congestion threshold or radio interface message value that is utilized by the UE to determine whether the unattended data is allowed or not allowed. The indication of whether the unattended data is allowed or not allowed may be included in an SIB overhead message transmitted to the UE. In other words, the congestion information sent to the UE may depend on the SIB being transmitted within a specific cell or during specific subframes. The congestion information, for example, can be set based on network congestion corresponding to a specific timescale, a specific geographic region, and/or a specific portion or aspect of the wireless network, such as uplink or downlink.

In addition, in certain embodiments the network entity may indicate to the UE further congestion information through an order in which pages are listed within paging messages. For example, the ALTO messaging may indicate to the UE that if the first paging identity listed within the paging message is larger than the second paging identity listed within the paging message, then the network may be even more or less congested than would be normally indicated by the unattended data allowed indicator. On the other hand, if the ALTO messaging indicates to the UE that the first paging identity listed within the paging message is smaller than the second paging identity listed within the paging message, the network is even less (or more) congested than would be normally indicated by the unattended data allowed indicator.

The paging messages may be specific to a single cell, or may apply to a plurality of cells, in certain embodiments. In one embodiment, the congestion information may include a specific paging identification, such as international mobile subscriber identity (IMSI) values, that is included within a paging message to or from a particular cell or region. The paging identifications may be used to determine the order of various congestion information received by the UE and/or when the congestion information may be applicable.

Figure 2:
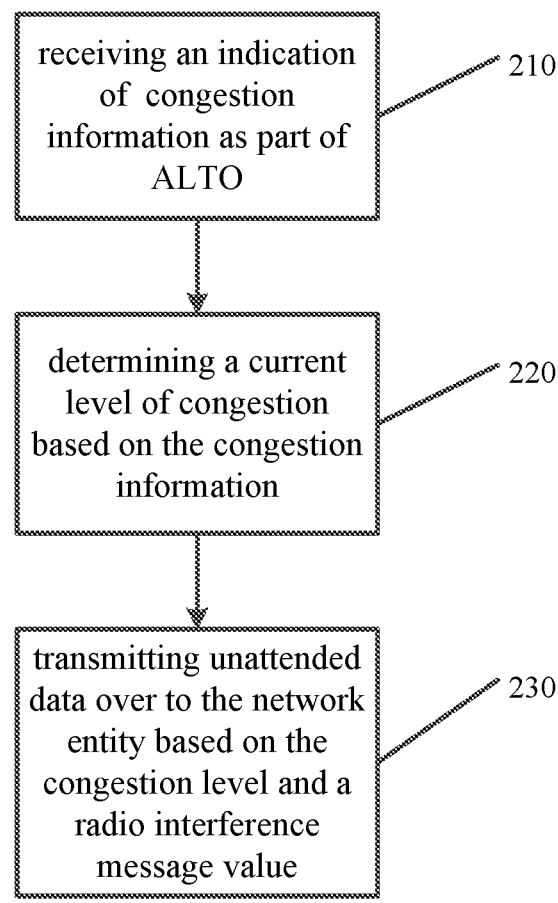
FIG. 2 illustrates a flow diagram according to certain embodiments.

FIG. 2 illustrates a flow diagram according to certain embodiments. In particular, FIG. 2 illustrates an embodiment of a UE. In step 210, the UE may receive an indication of congestion information as part of ALTO. The congestion information may include a first congestion level relating to a first radio interface message value of a first access point, and a second congestion level relating to a second radio interface message value of the first access point. In other embodiments, the second radio interface message value may relate to a second level of congestion at a second access point.

The congestion information, in some embodiments, may include a congestion threshold and/or an indication of whether the transmission of unattended data may be allowed or may not be allowed. The first radio interface message value, for example, may indicate that unattended data is allowed, and the second radio interface message value, for example, may indicate that the unattended data is not allowed.

The congestion information may be used to determine as part of ALTO a current level of congestion based on the first congestion level, the first radio interface value, the second congestion level, and the second radio interface value, as shown in step 220. The current level of congestion may be any level of congestion during a time period after the first level of congestion and second level of congestion are determined. In other embodiments, the current level of congestion may be any level of congestion during the time period in which the first and/or the second congestion levels are determined. For example, the congestion information may include a congestion threshold that can be used to determine a network congestion level, which may be used by the UE to determine whether to transmit unattended data over to the network entity based on the level of congestion, as shown in step 230.

In certain embodiments, ALTO indicates congestion information to a network entity, which may include a congestion threshold. The congestion information may therefore originate at another network entity, for example an ALTO server, other than the network entity which interacts with the UE. The sending of the information from the ALTO server may be triggered by an ALTO client who queries the server, which can cover topology spanning from the UE to the packet data network (PDN) gateway. The ALTO client may trigger the query in order in an effort to determine via which cell it should connect to the network.

The congestion information may include a congestion threshold that is to be utilized by a specific network entity to determine whether the network entity will transmit over the radio interface. The threshold value may also be used by the RF air interface to determine how the network entity will determine the RF air interface messaging. In other words, the RF air interface messaging will indicate that unattended data is allowed or not allowed. ALTO can provide this threshold value to enable the UE to better interpret the RF interface information, to determine whether the unattended data may or may not be allowed.

ALTO, in some embodiments, may indicate to the UE two different conditional congestion information values. In one embodiment, the congestion information value may be allowed, and indicated as an_UDA or a "yes", while in another embodiment the congestion information value may not be allowed, and indicated as an _UNDA or a "no". When the congestion information value is a "yes" the UE may transmit unattended data. On the other hand, when the congestion information value is a "no" the UE may not transmit unattended data.

In certain embodiments, ALTO may provide the congestion threshold (CTh) triggering an unattended data indication state change. The indication can be in the form of a calendar which provides a set of time dependent CTh values together with context-dependent RF costs to determine whether unattended data is allowed or not allowed. The calendar may be included in the congestion information sent to the UE. In other words, ALTO may provide a whole cost map that represents connection costs and properties associated to several cells. The UE may then have a broader vision of the cellular map, and schedule the downloading of the map at an appropriate time. In some embodiment, the UE may abstract data from the calendar which will keep network information confidential. The above embodiment may therefore employ an ALTO cost calendar that conveys to the UE as part of the congestion information.

As shown in FIGS. 1 and 2, the network entity may indicate a congestion threshold to the UE. For example, a first network entity in a first cell and a second network entity in a second cell may each have their own thresholds. The first network entity in the first cell may have a larger congestion threshold, for example 80, for determining if the RF interface indicates whether unattended data may be allowed or not. The second network entity in the second cell, on the other hand, may have a smaller congestion threshold of 30 for determining if the RF interface indicates whether unattended data is allowed or forbidden. Such thresholds may be provided from the network entity to the UE.

Upon receiving the congestion information, including the congestion threshold, the UE may become aware of which particular cell or cells may or may not allow unattended data. The UE may use the congestion information to determine that when the first cell indicates that unattended data is allowed, the network congestion level may be 70. When the first cell indicates that unattended data may not allowed, however, the network congestion level is 90. As for the second cell, the UE may determine a network congestion level of 20 when the second cell allows for unattended data, and a network congestion level of 40 when the second cell does not allow for unattended data. The network congestion level may therefore be adjusted based on an indication of whether or not the unattended data is allowed in a given cell. In certain embodiments, the indication of whether or not the unattended data is allowed in a given cell may be referred to as congestion information or RF congestion messaging based context.

Figure 3:
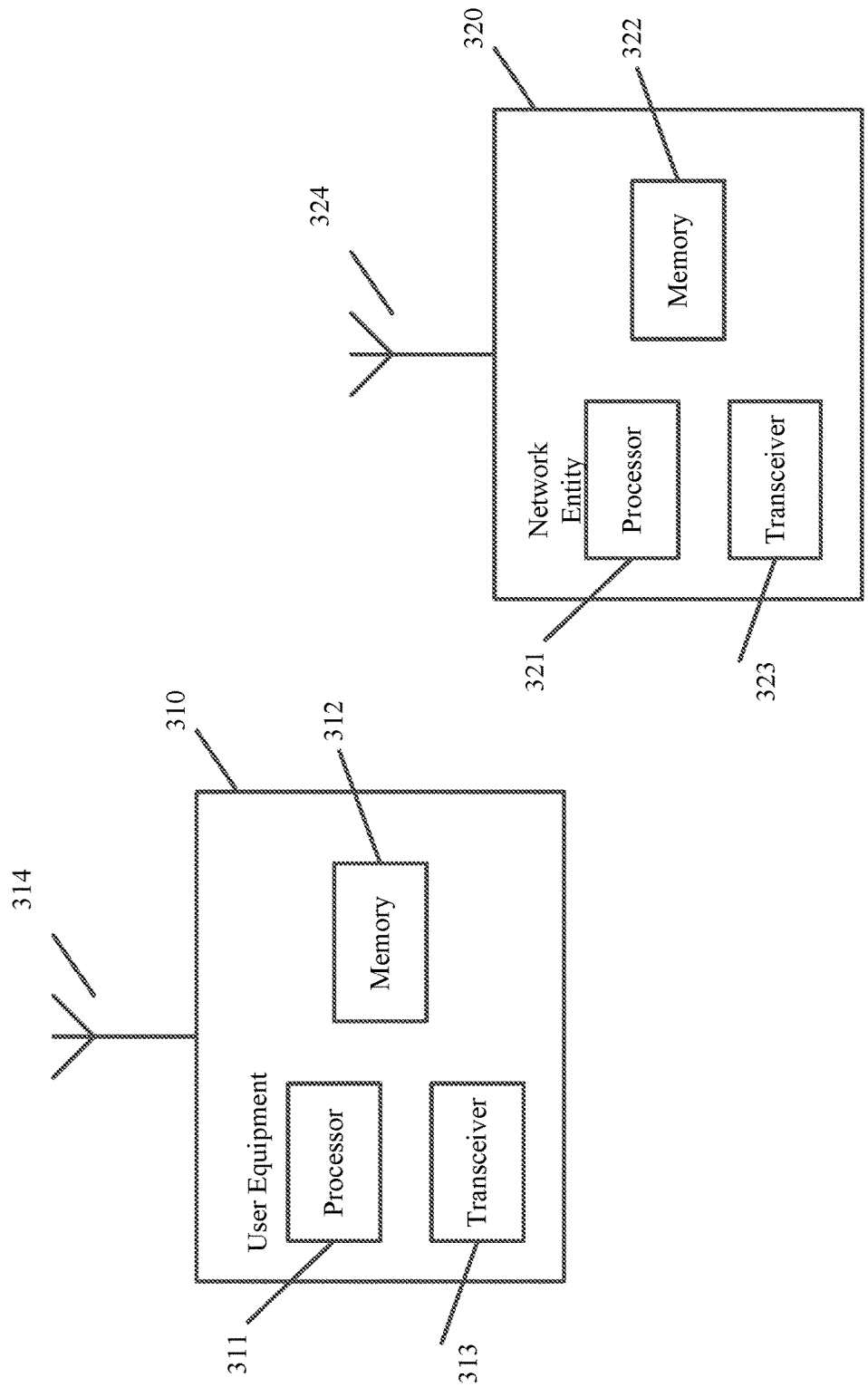
FIG. 3 illustrates a system according to certain embodiments.

FIG. 3 illustrates a system according to certain embodiments. It should be understood that each block in FIGS. 1 and 2 may be implemented by various means or their combinations, such as hardware, software, firmware, one or more processors and/or circuitry. In one embodiment, a system may include several devices, such as, for example, network entity 320 or UE 310. The system may include more than one UE 310 and more one network entity 320, although only one access node shown for the purposes of illustration. A network entity may be an access node, a base station, an eNB, server, host, or any of the other access or network node discussed herein. The network entity may also include one or more access points. In some embodiments a first access point and a second access point may be located in two different nodes, while in other embodiments the first and second access points may be located in the same node.

Each of these devices may include at least one processor or control unit or module, respectively indicated as 311 and 321. At least one memory may be provided in each device, and indicated as 312 and 322, respectively. The memory may include computer program instructions or computer code contained therein. One or more transceiver 313 and 323 may be provided, and each device may also include an antenna, respectively illustrated as 314 and 324. Although only one antenna each is shown, many antennas and multiple antenna elements may be provided to each of the devices. Other configurations of these devices, for example, may be provided. For example, network entity 320 and UE 310 may be additionally configured for wired communication, in addition to wireless communication, and in such a case antennas 314 and 324 may illustrate any form of communication hardware, without being limited to merely an antenna.

Transceivers 313 and 323 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 310 may be any electronic device capable of M2M communication, and capable of supporting an MTC application. For example, a user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a network entity, may include means for carrying out embodiments described above in relation to FIGS. 1 and 2. In certain embodiments, at least one memory including computer program code can be configured to, with the at least one processor, cause the apparatus at least to perform any of the processes described herein.

According to certain embodiments, an apparatus 320 may include at least one memory 322 including computer program code, and at least one processor 321. The at least one memory 322 and the computer program code are configured, with the at least one processor 321, to cause the apparatus 320 at least to send congestion information of a first access point as part of the application layer traffic optimization from a network entity to a user equipment. The congestion information comprises a first congestion level relating to a first radio interface message value of the first access point and a second congestion level relating to a second radio interface message value at the first access point. In addition, the user equipment is configured to determine a current level of congestion at the first access point based on the first congestion level, the first radio interface messaging value, the second congestion level, and the second radio interface messaging value.

According to certain embodiments, an apparatus 310 may include at least one memory 312 including computer program code, and at least one processor 311. The at least one memory 312 and the computer program code are configured, with the at least one processor 311, to cause the apparatus 310 at least to receive at a user equipment from a network entity congestion information of a first access point as part of an application layer traffic optimization. The congestion information comprises a first congestion level relating to a first radio interface message value at the first access point and a second congestion level relating to a second radio interface message value at the first access point. The at least one memory 312 and the computer program code may be configured, with the at least one processor 311, to also cause the apparatus 310 at least to determine as part of the application layer traffic optimization a current level of congestion at the first access point based on the first congestion level, the first radio interface value, the second congestion level, and the second radio interface value.

Processors 311 and 321 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 312 and 322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 320 or UE 310, to perform any of the processes described above (see, for example, FIGS. 1 and 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 3 illustrates a system including a network entity 320 and UE 310, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 310 may likewise be provided with a variety of configurations for communication other than communication network entity 320. For example, the UE 310 may be configured for device-to-device communication.

Certain embodiments may allow the UE to schedule and/or manage unattended data traffic, which is often delay tolerant, as part of an ALTO. The UE and the network entity may also be able to react to short-term traffic changes, and make better informed decisions with regards to the utilized access paths between them. Further, providing the UE with congestion information may help to optimize the load balancing of the network. Thus, the above embodiments provide significant improvements to the functioning of a network and/or to the functioning of the nodes or computers within the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to a 5G environment, other embodiments can be directed to an LTE environment.

PARTIAL GLOSSARY

3 GPP 3rd Generation Partnership Project
LTE Long Term Evolution
UE User Equipment
IETF Internet Engineering Task Force
ALTO Application Layer Traffic Optimization
OTT over-the-top
P2P Peer-to-Peer
CDN Content Delivery Networks
NO Network Operator
SIB Session Information Block
WLAN Wireless Local Area Network
RSRP Reference Signal Received Power
RSRQ Reference Signal Received Quality
RF Radio Frequency
IMSI International Mobile Subscriber Identity

We claim:

1. A method comprising:
sending congestion information of a first access point as part of an application layer traffic optimization from a network entity to a user equipment,
wherein the congestion information comprises a first congestion level relating to a first radio interface message value at the first access point and a second congestion level relating to a second radio interface message value at the first access point, and
wherein the user equipment is configured to determine a current level of congestion at the first access point based on the first congestion level, the first radio interface message value, the second congestion level, and the second radio interface message value.

2. The method according to claim 1, further comprising:
determining at the network entity congestion information as part of the application layer traffic optimization.

3. The method according to claim 1, wherein the first radio interface messaging value indicates that unattended data is allowed, and wherein the second radio interface messaging value indicates that the unattended data is not allowed.

4. The method according to claim 1, wherein the application layer transport optimization comprises over the top (OTT) signaling.

5. The method according to claim 1, further comprising:
sending an indication of the unattended data indication over a radio interface from the network entity, wherein the indication of the unattended data is based on a network congestion level threshold.

6. The method according to claim 1, wherein the congestion information is conveyed via a paging message, and the congestion information is indicated with a specific paging identity or through an order in which pages are listed within the paging message.

7. The method according to claim 1, wherein the congestion information comprises an indication of at least one of uplink or downlink congestion information.

8. The method according to claim 1, wherein the congestion information comprises long-term network congestion information or short-term network congestion information.

9. The method according to claim 1, wherein the congestion information comprises network congestion information of at least two cells or at least two networks.

10. The method according to claim 1, wherein the congestion information comprises network congestion information of at least a second access point.

11. The method according to claim 1, further comprising:
receiving at least some of the congestion information from another network entity.

12. A method comprising:
receiving at a user equipment from a network entity congestion information of a first access point as part of an application layer traffic optimization, wherein the congestion information comprises a first congestion level relating to a first radio interface message value at the first access point and a second congestion level relating to a second radio interface message value at the first access point; and
determining as part of the application layer traffic optimization a current level of congestion the first access point based on the first congestion level, the first radio interface message value, the second congestion level, and the second radio interface message value.

13. The method according to claim 12, further comprising:
transmitting unattended data to the network entity based on the first congestion level and the second congestion level.

14. The method according to claim 12, wherein the first radio interface message value indicates that unattended data is allowed, and wherein the second radio interface message value indicates that the unattended data is not allowed.

15. The method according to claim 12, further comprising:
observing a signal strength of a network entity from which the congestion information is received; and
determining a network congestion level based using the signal strength.

16. The method according to claim 15, wherein the congestion information is received via a paging message, and the congestion information is indicated with a specific paging identity or through an order in which pages are listed within the paging message.

17. The method according to claim 12, wherein the congestion information comprises an indication of at least one of uplink or downlink congestion information.

18. The method according to claim 12, wherein the congestion information comprises long-term network congestion information or short-term network congestion information.

19. An apparatus, comprising:
at least one processor; and
at least one memory including computer program code,
wherein the at least one memory and the computer program code are configured to, with the at least one processor, cause the apparatus at least to perform a process comprising:
sending congestion information of a first access point as part of an application layer traffic optimization from a network entity to a user equipment,
wherein the congestion information comprises a first congestion level relating to a first radio interface message value at the first access point and a second congestion level relating to a second radio interface message value at the first access point, and
wherein the user equipment is configured to determine a current level of congestion at the first access point based on the first congestion level, the first radio interface message value, the second congestion level, and the second radio interface message value.

20. A non-transitory computer-readable medium encoding instructions that, when executed in hardware, perform a process according to claim 1.

* * * * *